E. KNOCK.
Miter-Boxes.

No. 154,402. Patented Aug. 25, 1874.

WITNESSES:

INVENTOR:
E. Knock

BY
ATTORNEYS.

UNITED STATES PATENT OFFICE.

EDWIN KNOCK, OF VERMONT, ILLINOIS.

IMPROVEMENT IN MITER-BOXES.

Specification forming part of Letters Patent No. 154,402, dated August 25, 1874; application filed May 9, 1874.

*To all whom it may concern:*

Be it known that I, EDWIN KNOCK, of Vermont, in the county of Fulton and State of Illinois, have invented a new and useful Improvement in Miter-Boxes, of which the following is a specification:

This invention relates to boxes for guiding the saw in sawing miters and other angles in doing wood-work of various kinds; and consists in the construction and arrangement of parts hereinafter described.

Figure 1:
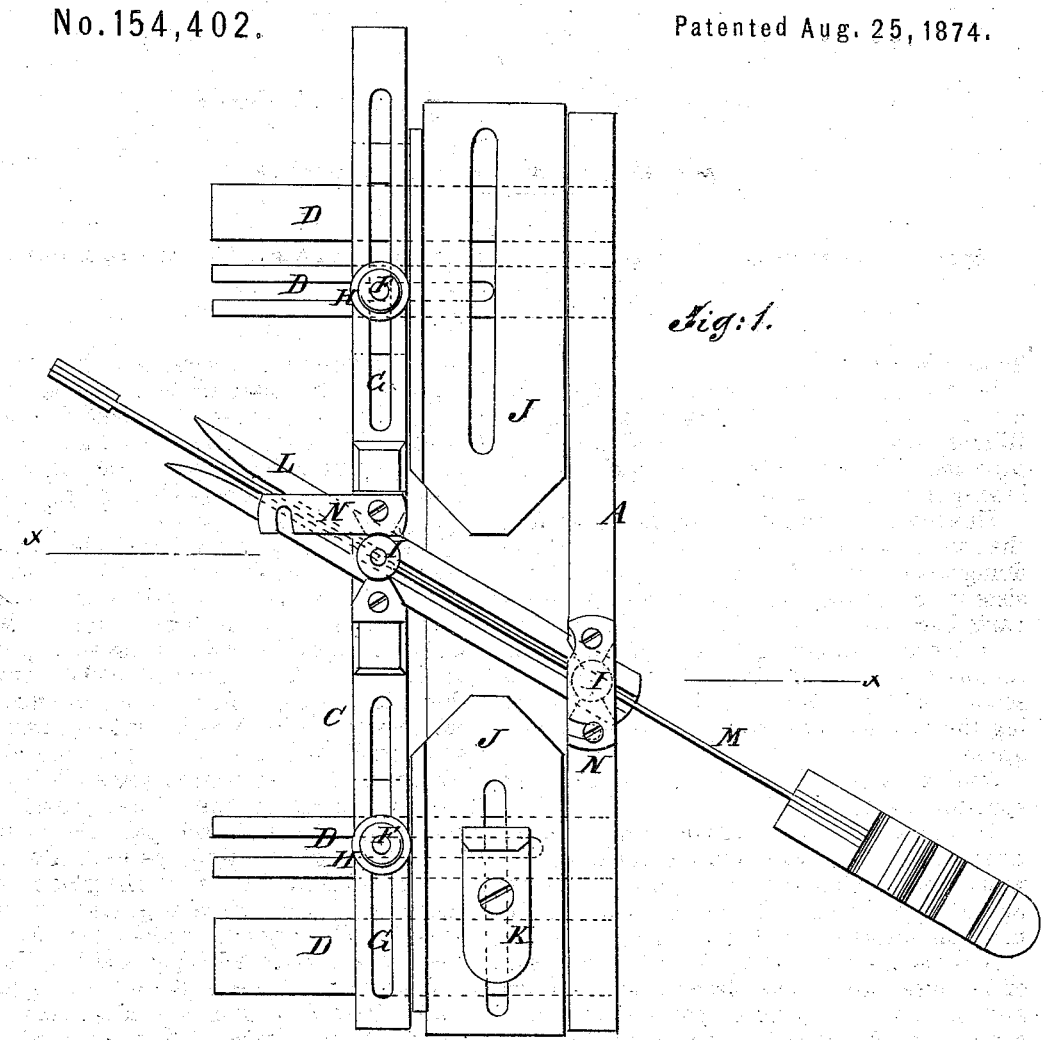
Figure 2:
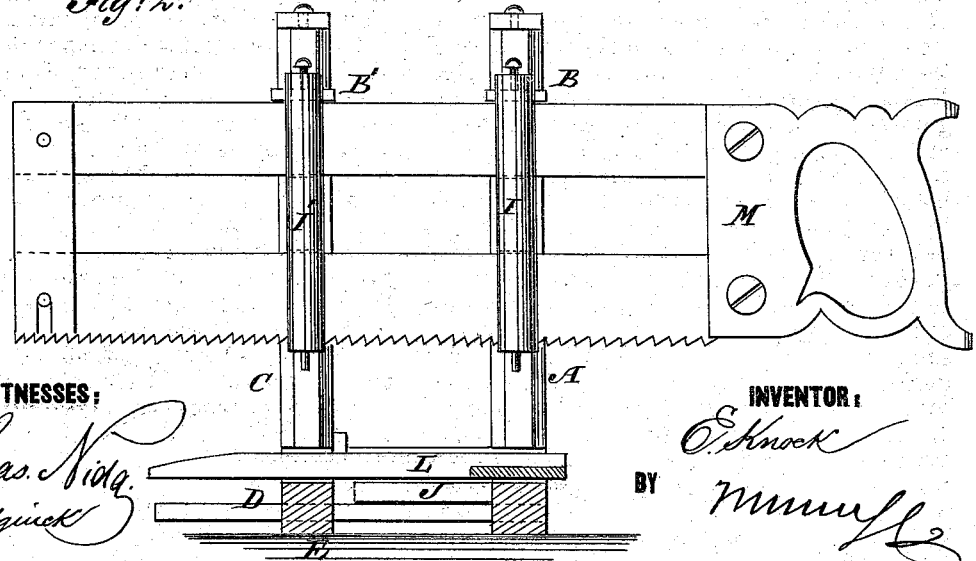

In the accompanying drawing, Figure 1 represents a top or plan view. Fig. 2 is a cross-section of Fig. 1, taken on the line $x$ $x$, showing the saw and its arrangement in the saw-guides.

Similar letters of reference indicate corresponding parts.

This miter-box is designed to be made entirely of iron or other suitable metal, so that water and dampness will not warp or affect any of its parts; but it may be made of any material suitable for the purpose.

A is the main stationary front plate or side of the miter-box. This plate stands edgewise and supports one pair of saw-guides, which are marked B. C is the movable or adjustable plate or side, which carries the other pair of saw-guides B'. D are transverse guides, rigidly attached to the main plate A, on which the adjustable plate C rests as it is adjusted. E is a supporting-bar beneath the transverse guides D. This bar is connected with the adjustable plate C by two bolts, F. G are vertical slots in the plate C, through which the bolts F pass. Each bolt has a thumb-nut, H, by means of which the guides D are griped between the bar E and the plate C. The saw-guides B B' are supported vertically by the two plates A and C at a suitable distance from each other to admit of a round pivot-piece, I, each. The inner side of each pair of saw-guides has a circular groove to fit the diameter of the round pivot-pieces I. The pieces I are attached to the saw, so that it passes through the middle of each, and, in sawing, serve as guides, through which the saw freely works. By means of the slots G the adjustable plate C may be moved longitudinally in either direction, for adjusting the saw to an angle with the main plate A. When the desired angle is obtained, the plate C is held in position by turning down the thumb-nuts H. J is an adjustable bed for the piece to be sawed. K is an adjustable stop-gage to give the length of pieces sawed. L is a fork, attached to the main plate A (between the guide-stands) by a pivot-screw, which allows it to turn with the saw. Its forked end rests in a horizontal slot in the lower edge of the adjustable plate C. The transverse guides D are in two parts at each end of the miter-box, the inner parts being forked to guide the clamping-bolts F. M represents the saw. The saw turns as on a pivot in the main plate in adjusting it to the desired angle. N N are removable hooks on top of the guides B, by which the stands of each pair are connected. The saw (with the pivot-pieces I attached) is introduced from the top of the guides, and is supported by the circular grooves in the inner sides of the guides, which allow the pivot-pieces I to turn in the adjustment of the saw.

The adjustable plate, it will be seen, may be moved toward or from the main plate A, according to the width of the piece to be sawed, and may be adjusted to saw from a right angle to almost any other desired angle.

This miter-box may be made of any size to adapt it to any description of wood-work for which miter-boxes are used. Its advantages over the common miter-box are many, and must be obvious to all.

Having thus described my invention, I claim as new and desire to secure by Letters Patent—

1. The combination, with longitudinal adjustable plate C, of guides D, supporting-bar E, bolts F, and nuts H, arranged as and for the purpose described.

2. The combination of plates A C, bed J, having stop-gage K, and pivoted fork L, as and for the purpose specified.

EDWIN KNOCK.

Witnesses:
JOHN W. BERRY,
JAMES SEXTON.